(12) United States Patent
Seki et al.

(10) Patent No.: US 9,177,585 B1
(45) Date of Patent: Nov. 3, 2015

(54) MAGNETIC MEDIA CAPABLE OF IMPROVING MAGNETIC PROPERTIES AND THERMAL MANAGEMENT FOR HEAT-ASSISTED MAGNETIC RECORDING

(71) Applicant: WD Media, LLC, San Jose, CA (US)

(72) Inventors: Tomoko Seki, Sunnyvale, CA (US);
Antony Ajan, Santa Clara, CA (US);
Hua Yuan, Fremont, CA (US);
Alexander S. Chernyshov, San Jose, CA (US); Bincheng Wang, Sunnyvale, CA (US); B. Ramamurthy Acharya, Fremont, CA (US)

(73) Assignee: WD Media, LLC, San Jose, CA (US)

( * ) Notice: Subject to any disclaimer, the term of this patent is extended or adjusted under 35 U.S.C. 154(b) by 0 days.

(21) Appl. No.: 14/096,332

(22) Filed: Dec. 4, 2013

Related U.S. Application Data

(60) Provisional application No. 61/894,527, filed on Oct. 23, 2013.

(51) Int. Cl.
*G11B 11/00* (2006.01)
*G11B 5/73* (2006.01)
*G11B 13/04* (2006.01)
*G11B 11/105* (2006.01)

(52) U.S. Cl.
CPC .............. *G11B 5/7325* (2013.01); *G11B 13/04* (2013.01); *G11B 5/732* (2013.01); *G11B 11/10584* (2013.01)

(58) Field of Classification Search
USPC .................................. 369/13.33, 13.13, 13.32
See application file for complete search history.

(56) References Cited

U.S. PATENT DOCUMENTS

| | | |
|---|---|---|
| 6,013,161 A | 1/2000 | Chen et al. |
| 6,063,248 A | 5/2000 | Bourez et al. |
| 6,068,891 A | 5/2000 | O'Dell et al. |
| 6,086,730 A | 7/2000 | Liu et al. |
| 6,099,981 A | 8/2000 | Nishimori |
| 6,103,404 A | 8/2000 | Ross et al. |
| 6,117,499 A | 9/2000 | Wong et al. |
| 6,136,403 A | 10/2000 | Prabhakara et al. |
| 6,143,375 A | 11/2000 | Ross et al. |
| 6,145,849 A | 11/2000 | Bae et al. |
| 6,146,737 A | 11/2000 | Malhotra et al. |

(Continued)

FOREIGN PATENT DOCUMENTS

| | | |
|---|---|---|
| JP | 2003085702 | 3/2003 |
| JP | 2011060344 | 3/2011 |
| WO | 2008030199 | 3/2008 |

OTHER PUBLICATIONS

Andrew Bullen, et al., "Thermal Conductivity of Amorphous Carbon Thin Films," J. Appl. Phys. vol. 88, No. 11, Dec. 4, 2000, pp. 6316-6320.

(Continued)

*Primary Examiner* — Tan X Dinh

(57) ABSTRACT

A method and system provide a magnetic recording media usable in a heat assisted magnetic recording (HAMR) disk drive. The magnetic recording media includes a magnetic recording layer, a crystalline underlayer, and a crystalline heat sink layer. The crystalline underlayer is between the crystalline heat sink layer and the magnetic recording layer. The magnetic recording layer stores magnetic data. The crystalline underlayer has a first crystal structure. The crystalline heat sink layer has a second crystal structure.

19 Claims, 3 Drawing Sheets

(56) References Cited

U.S. PATENT DOCUMENTS

| | | |
|---|---|---|
| 6,149,696 A | 11/2000 | Jia |
| 6,150,015 A | 11/2000 | Bertero et al. |
| 6,156,404 A | 12/2000 | Ross et al. |
| 6,159,076 A | 12/2000 | Sun et al. |
| 6,164,118 A | 12/2000 | Suzuki et al. |
| 6,200,441 B1 | 3/2001 | Gornicki et al. |
| 6,200,673 B1 | 3/2001 | Miyamoto et al. |
| 6,204,995 B1 | 3/2001 | Hokkyo et al. |
| 6,206,765 B1 | 3/2001 | Sanders et al. |
| 6,210,819 B1 | 4/2001 | Lal et al. |
| 6,216,709 B1 | 4/2001 | Fung et al. |
| 6,221,119 B1 | 4/2001 | Homola |
| 6,248,395 B1 | 6/2001 | Homola et al. |
| 6,261,681 B1 | 7/2001 | Suekane et al. |
| 6,270,885 B1 | 8/2001 | Hokkyo et al. |
| 6,274,063 B1 | 8/2001 | Li et al. |
| 6,283,838 B1 | 9/2001 | Blake et al. |
| 6,287,429 B1 | 9/2001 | Moroishi et al. |
| 6,290,573 B1 | 9/2001 | Suzuki |
| 6,299,947 B1 | 10/2001 | Suzuki et al. |
| 6,303,217 B1 | 10/2001 | Malhotra et al. |
| 6,309,765 B1 | 10/2001 | Suekane et al. |
| 6,358,636 B1 | 3/2002 | Yang et al. |
| 6,362,452 B1 | 3/2002 | Suzuki et al. |
| 6,363,599 B1 | 4/2002 | Bajorek |
| 6,365,012 B1 | 4/2002 | Sato et al. |
| 6,381,090 B1 | 4/2002 | Suzuki et al. |
| 6,381,092 B1 | 4/2002 | Suzuki |
| 6,387,483 B1 | 5/2002 | Hokkyo et al. |
| 6,388,956 B1 | 5/2002 | Mori et al. |
| 6,391,213 B1 | 5/2002 | Homola |
| 6,395,349 B1 | 5/2002 | Salamon |
| 6,403,919 B1 | 6/2002 | Salamon |
| 6,408,677 B1 | 6/2002 | Suzuki |
| 6,426,157 B1 | 7/2002 | Hokkyo et al. |
| 6,429,984 B1 | 8/2002 | Alex |
| 6,468,670 B1 | 10/2002 | Ikeda et al. |
| 6,482,330 B1 | 11/2002 | Bajorek |
| 6,482,505 B1 | 11/2002 | Bertero et al. |
| 6,495,252 B1 | 12/2002 | Richter et al. |
| 6,500,567 B1 | 12/2002 | Bertero et al. |
| 6,528,124 B1 | 3/2003 | Nguyen |
| 6,537,638 B2 | 3/2003 | Do et al. |
| 6,548,821 B1 | 4/2003 | Treves et al. |
| 6,551,728 B1 | 4/2003 | Acharya et al. |
| 6,552,871 B2 | 4/2003 | Suzuki et al. |
| 6,565,719 B1 | 5/2003 | Lairson et al. |
| 6,566,674 B1 | 5/2003 | Treves et al. |
| 6,571,806 B2 | 6/2003 | Rosano et al. |
| 6,572,989 B2 | 6/2003 | Bian et al. |
| 6,607,842 B2 | 8/2003 | Bian et al. |
| 6,628,466 B2 | 9/2003 | Alex |
| 6,664,503 B1 | 12/2003 | Hsieh et al. |
| 6,670,055 B2 | 12/2003 | Tomiyasu et al. |
| 6,682,807 B2 | 1/2004 | Lairson et al. |
| 6,683,754 B2 | 1/2004 | Suzuki et al. |
| 6,707,766 B2 | 3/2004 | Mori et al. |
| 6,730,420 B1 | 5/2004 | Bertero et al. |
| 6,743,528 B2 | 6/2004 | Suekane et al. |
| 6,754,020 B1 | 6/2004 | Hikosaka et al. |
| 6,759,138 B2 | 7/2004 | Tomiyasu et al. |
| 6,778,353 B1 | 8/2004 | Harper |
| 6,795,274 B1 | 9/2004 | Hsieh et al. |
| 6,834,026 B2 | 12/2004 | Fullerton et al. |
| 6,846,543 B2 | 1/2005 | Bian et al. |
| 6,855,232 B2 | 2/2005 | Jairson et al. |
| 6,857,937 B2 | 2/2005 | Bajorek |
| 6,872,478 B2 | 3/2005 | Bian et al. |
| 6,881,497 B2 | 4/2005 | Coffey et al. |
| 6,893,748 B2 | 5/2005 | Bertero et al. |
| 6,899,959 B2 | 5/2005 | Bertero et al. |
| 6,916,558 B2 | 7/2005 | Umezawa et al. |
| 6,926,977 B2 | 8/2005 | Osawa et al. |
| 6,939,120 B1 | 9/2005 | Harper |
| 6,946,191 B2 | 9/2005 | Morikawa et al. |
| 6,950,260 B2 | 9/2005 | Coffey et al. |
| 6,967,798 B2 | 11/2005 | Homola et al. |
| 6,972,135 B2 | 12/2005 | Homola |
| 7,004,827 B1 | 2/2006 | Suzuki et al. |
| 7,006,323 B1 | 2/2006 | Suzuki |
| 7,016,154 B2 | 3/2006 | Nishihira |
| 7,019,924 B2 | 3/2006 | McNeil et al. |
| 7,045,215 B2 | 5/2006 | Shimokawa |
| 7,060,375 B2 | 6/2006 | Lee et al. |
| 7,070,870 B2 | 7/2006 | Bertero et al. |
| 7,090,934 B2 | 8/2006 | Hokkyo et al. |
| 7,099,112 B1 | 8/2006 | Harper |
| 7,105,241 B2 | 9/2006 | Shimokawa et al. |
| 7,119,990 B2 | 10/2006 | Bajorek et al. |
| 7,147,790 B2 | 12/2006 | Wachenschwanz et al. |
| 7,161,753 B2 | 1/2007 | Wachenschwanz et al. |
| 7,163,756 B2 | 1/2007 | Yamamoto et al. |
| 7,166,319 B2 | 1/2007 | Ishiyama |
| 7,166,374 B2 | 1/2007 | Suekane et al. |
| 7,169,487 B2 | 1/2007 | Kawai et al. |
| 7,174,775 B2 | 2/2007 | Ishiyama |
| 7,179,549 B2 | 2/2007 | Malhotra et al. |
| 7,184,139 B2 | 2/2007 | Treves et al. |
| 7,196,860 B2 | 3/2007 | Alex |
| 7,199,977 B2 | 4/2007 | Suzuki et al. |
| 7,208,236 B2 | 4/2007 | Morikawa et al. |
| 7,220,500 B1 | 5/2007 | Tomiyasu et al. |
| 7,229,266 B2 | 6/2007 | Harper |
| 7,239,970 B2 | 7/2007 | Treves et al. |
| 7,241,517 B2 | 7/2007 | Acharya et al. |
| 7,252,897 B2 | 8/2007 | Shimokawa et al. |
| 7,277,254 B2 | 10/2007 | Shimokawa et al. |
| 7,281,920 B2 | 10/2007 | Homola et al. |
| 7,292,329 B2 | 11/2007 | Treves et al. |
| 7,300,713 B2 | 11/2007 | Bian et al. |
| 7,301,726 B1 | 11/2007 | Suzuki |
| 7,302,148 B2 | 11/2007 | Treves et al. |
| 7,305,119 B2 | 12/2007 | Treves et al. |
| 7,314,404 B2 | 1/2008 | Singh et al. |
| 7,320,584 B1 | 1/2008 | Harper et al. |
| 7,329,114 B2 | 2/2008 | Harper et al. |
| 7,375,362 B2 | 5/2008 | Treves et al. |
| 7,420,886 B2 | 9/2008 | Tomiyasu et al. |
| 7,425,719 B2 | 9/2008 | Treves et al. |
| 7,471,484 B2 | 12/2008 | Wachenschwanz et al. |
| 7,498,062 B2 | 3/2009 | Calcaterra et al. |
| 7,521,137 B2 | 4/2009 | Hohlfeld et al. |
| 7,531,485 B2 | 5/2009 | Hara et al. |
| 7,537,846 B2 | 5/2009 | Ishiyama et al. |
| 7,549,209 B2 | 6/2009 | Wachenschwanz et al. |
| 7,569,490 B2 | 8/2009 | Staud |
| 7,582,368 B2 | 9/2009 | Berger et al. |
| 7,588,841 B2 | 9/2009 | Berger et al. |
| 7,597,792 B2 | 10/2009 | Homola et al. |
| 7,597,973 B2 | 10/2009 | Ishiyama |
| 7,608,193 B2 | 10/2009 | Wachenschwanz et al. |
| 7,632,087 B2 | 12/2009 | Homola |
| 7,656,615 B2 | 2/2010 | Wachenschwanz et al. |
| 7,678,476 B2 | 3/2010 | Weller et al. |
| 7,682,546 B2 | 3/2010 | Harper |
| 7,684,152 B2 | 3/2010 | Suzuki et al. |
| 7,686,606 B2 | 3/2010 | Harper et al. |
| 7,686,991 B2 | 3/2010 | Harper |
| 7,695,833 B2 | 4/2010 | Ishiyama |
| 7,722,968 B2 | 5/2010 | Ishiyama |
| 7,733,605 B2 | 6/2010 | Suzuki et al. |
| 7,736,768 B2 | 6/2010 | Ishiyama |
| 7,736,769 B2 | 6/2010 | Ajan |
| 7,755,861 B1 | 7/2010 | Li et al. |
| 7,758,732 B1 | 7/2010 | Calcaterra et al. |
| 7,833,639 B2 | 11/2010 | Sonobe et al. |
| 7,833,641 B2 | 11/2010 | Tomiyasu et al. |
| 7,862,914 B2 | 1/2011 | Kubota et al. |
| 7,869,162 B2 | 1/2011 | Lu et al. |
| 7,910,159 B2 | 3/2011 | Jung |
| 7,911,736 B2 | 3/2011 | Bajorek |
| 7,924,519 B2 | 4/2011 | Lambert |
| 7,944,165 B1 | 5/2011 | O'Dell |
| 7,944,643 B1 | 5/2011 | Jiang et al. |

(56) References Cited

U.S. PATENT DOCUMENTS

| | | | |
|---|---|---|---|
| 7,955,723 B2 | 6/2011 | Umezawa et al. |
| 7,983,003 B2 | 7/2011 | Sonobe et al. |
| 7,993,497 B2 | 8/2011 | Moroishi et al. |
| 7,993,765 B2 | 8/2011 | Kim et al. |
| 7,998,912 B2 | 8/2011 | Chen et al. |
| 8,002,901 B1 | 8/2011 | Chen et al. |
| 8,003,237 B2 | 8/2011 | Sonobe et al. |
| 8,012,920 B2 | 9/2011 | Shimokawa |
| 8,038,863 B2 | 10/2011 | Homola |
| 8,057,926 B2 | 11/2011 | Ayama et al. |
| 8,062,778 B2 | 11/2011 | Suzuki et al. |
| 8,064,156 B1 | 11/2011 | Suzuki et al. |
| 8,076,013 B2 | 12/2011 | Sonobe et al. |
| 8,092,931 B2 | 1/2012 | Ishiyama et al. |
| 8,100,685 B1 | 1/2012 | Harper et al. |
| 8,101,054 B2 | 1/2012 | Chen et al. |
| 8,125,723 B1 | 2/2012 | Nichols et al. |
| 8,125,724 B1 | 2/2012 | Nichols et al. |
| 8,137,517 B1 | 3/2012 | Bourez |
| 8,142,916 B2 | 3/2012 | Umezawa et al. |
| 8,149,539 B2 | 4/2012 | Lu et al. |
| 8,163,093 B1 | 4/2012 | Chen et al. |
| 8,171,949 B1 | 5/2012 | Lund et al. |
| 8,173,282 B1 | 5/2012 | Sun et al. |
| 8,178,480 B2 | 5/2012 | Hamakubo et al. |
| 8,179,637 B2 | 5/2012 | Takeshita |
| 8,206,789 B1 | 6/2012 | Suzuki |
| 8,218,260 B2 | 7/2012 | Iamratanakul et al. |
| 8,247,095 B2 | 8/2012 | Champion et al. |
| 8,257,783 B2 | 9/2012 | Suzuki et al. |
| 8,279,739 B2 | 10/2012 | Kanbe et al. |
| 8,298,609 B1 | 10/2012 | Liew et al. |
| 8,298,689 B2 | 10/2012 | Sonobe et al. |
| 8,309,239 B2 | 11/2012 | Umezawa et al. |
| 8,316,668 B1 | 11/2012 | Chan et al. |
| 8,331,056 B2 | 12/2012 | O'Dell |
| 8,351,309 B2 | 1/2013 | Kanbe et al. |
| 8,354,618 B1 | 1/2013 | Chen et al. |
| 8,367,228 B2 | 2/2013 | Sonobe et al. |
| 8,383,209 B2 | 2/2013 | Ayama |
| 8,394,243 B2 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,509,039 B1 * | 8/2013 | Huang et al. ............... 369/30.03 |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 * | 12/2013 | Chernyshov et al. ...... 369/13.33 |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 8,696,404 B2 | 4/2014 | Sun et al. |
| 8,711,499 B1 | 4/2014 | Desai et al. |
| 8,743,666 B1 | 6/2014 | Bertero et al. |
| 8,758,912 B2 | 6/2014 | Srinivasan et al. |
| 8,787,124 B1 | 7/2014 | Chernyshov et al. |
| 8,787,130 B1 | 7/2014 | Yuan et al. |
| 8,791,391 B2 | 7/2014 | Bourez |
| 8,795,765 B2 | 8/2014 | Koike et al. |
| 8,795,790 B2 | 8/2014 | Sonobe et al. |
| 8,795,857 B2 | 8/2014 | Ayama et al. |
| 8,800,322 B1 | 8/2014 | Chan et al. |
| 8,811,129 B1 | 8/2014 | Yuan et al. |
| 8,817,410 B1 | 8/2014 | Moser et al. |
| 8,867,322 B1 | 10/2014 | Chernyshov et al. |
| 8,956,741 B1 * | 2/2015 | Li et al. ...................... 428/831 |
| 2001/0051287 A1 | 12/2001 | Kikitsu et al. |
| 2002/0060883 A1 | 5/2002 | Suzuki |
| 2003/0022024 A1 | 1/2003 | Wachenschwanz |
| 2003/0096077 A1 | 5/2003 | Ju et al. |
| 2004/0022387 A1 | 2/2004 | Weikle |
| 2004/0132301 A1 | 7/2004 | Harper et al. |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |
| 2005/0016836 A1 | 1/2005 | Kuo et al. |
| 2005/0031909 A1 | 2/2005 | Bian et al. |
| 2005/0036223 A1 | 2/2005 | Wachenschwanz et al. |
| 2005/0069730 A1 | 3/2005 | Doerner et al. |
| 2005/0089726 A1 | 4/2005 | Abarra |
| 2005/0142390 A1 | 6/2005 | Ajan et al. |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0163962 A1 | 7/2005 | Kawato et al. |
| 2005/0167867 A1 | 8/2005 | Bajorek et al. |
| 2005/0202287 A1 | 9/2005 | Lu et al. |
| 2005/0227123 A1 | 10/2005 | Ajan |
| 2005/0263401 A1 | 12/2005 | Olsen et al. |
| 2006/0002026 A1 | 1/2006 | Stipe et al. |
| 2006/0147758 A1 | 7/2006 | Jung et al. |
| 2006/0181697 A1 | 8/2006 | Treves et al. |
| 2006/0207890 A1 | 9/2006 | Staud |
| 2006/0222896 A1 | 10/2006 | Inomata et al. |
| 2007/0026263 A1 | 2/2007 | Kubota et al. |
| 2007/0070549 A1 | 3/2007 | Suzuki et al. |
| 2007/0245909 A1 | 10/2007 | Homola |
| 2008/0026255 A1 | 1/2008 | Das et al. |
| 2008/0074776 A1 | 3/2008 | Soeya |
| 2008/0075845 A1 | 3/2008 | Sonobe et al. |
| 2008/0093760 A1 | 4/2008 | Harper et al. |
| 2008/0226817 A1 | 9/2008 | Lee |
| 2009/0040644 A1 | 2/2009 | Lu et al. |
| 2009/0117408 A1 | 5/2009 | Umezawa et al. |
| 2009/0136782 A1 | 5/2009 | Lu |
| 2009/0136784 A1 | 5/2009 | Suzuki et al. |
| 2009/0169922 A1 | 7/2009 | Ishiyama |
| 2009/0191331 A1 | 7/2009 | Umezawa et al. |

(56) References Cited

U.S. PATENT DOCUMENTS

| | | | |
|---|---|---|---|
| 2009/0202866 A1 | 8/2009 | Kim et al. | |
| 2009/0311557 A1 | 12/2009 | Onoue et al. | |
| 2010/0021770 A1 | 1/2010 | Hazanov et al. | |
| 2010/0053811 A1 | 3/2010 | Takeshita | |
| 2010/0110577 A1 | 5/2010 | Weller et al. | |
| 2010/0143752 A1 | 6/2010 | Ishibashi et al. | |
| 2010/0159285 A1 | 6/2010 | Peng et al. | |
| 2010/0178529 A1 | 7/2010 | Marinero | |
| 2010/0182714 A1 | 7/2010 | Kanbe et al. | |
| 2010/0190035 A1 | 7/2010 | Sonobe et al. | |
| 2010/0196619 A1 | 8/2010 | Ishiyama | |
| 2010/0196740 A1 | 8/2010 | Ayama et al. | |
| 2010/0209601 A1 | 8/2010 | Shimokawa et al. | |
| 2010/0215992 A1 | 8/2010 | Horikawa et al. | |
| 2010/0232065 A1 | 9/2010 | Suzuki et al. | |
| 2010/0247965 A1 | 9/2010 | Onoue | |
| 2010/0261039 A1 | 10/2010 | Itoh et al. | |
| 2010/0279151 A1 | 11/2010 | Sakamoto et al. | |
| 2010/0300884 A1 | 12/2010 | Homola et al. | |
| 2010/0304186 A1 | 12/2010 | Shimokawa | |
| 2011/0011733 A1 | 1/2011 | Yang et al. | |
| 2011/0096432 A1 | 4/2011 | Lu et al. | |
| 2011/0097603 A1 | 4/2011 | Onoue | |
| 2011/0097604 A1 | 4/2011 | Onoue | |
| 2011/0171495 A1 | 7/2011 | Tachibana et al. | |
| 2011/0205862 A1* | 8/2011 | Kanbe et al. | 369/13.32 |
| 2011/0206947 A1 | 8/2011 | Tachibana et al. | |
| 2011/0212346 A1 | 9/2011 | Onoue et al. | |
| 2011/0223446 A1 | 9/2011 | Onoue et al. | |
| 2011/0235479 A1* | 9/2011 | Kanbe et al. | 369/13.32 |
| 2011/0244119 A1 | 10/2011 | Umezawa et al. | |
| 2011/0299194 A1 | 12/2011 | Aniya et al. | |
| 2011/0311841 A1 | 12/2011 | Saito et al. | |
| 2012/0069466 A1 | 3/2012 | Okamoto et al. | |
| 2012/0070692 A1 | 3/2012 | Sato et al. | |
| 2012/0077060 A1 | 3/2012 | Ozawa | |
| 2012/0113768 A1* | 5/2012 | Kanbe et al. | 369/13.24 |
| 2012/0127599 A1 | 5/2012 | Shimokawa et al. | |
| 2012/0127601 A1 | 5/2012 | Suzuki et al. | |
| 2012/0129009 A1 | 5/2012 | Sato et al. | |
| 2012/0140359 A1 | 6/2012 | Tachibana | |
| 2012/0141833 A1 | 6/2012 | Umezawa et al. | |
| 2012/0141835 A1 | 6/2012 | Sakamoto | |
| 2012/0148875 A1 | 6/2012 | Hamakubo et al. | |
| 2012/0156523 A1 | 6/2012 | Seki et al. | |
| 2012/0164488 A1 | 6/2012 | Shin et al. | |
| 2012/0170152 A1 | 7/2012 | Sonobe et al. | |
| 2012/0171369 A1 | 7/2012 | Koike et al. | |
| 2012/0175243 A1 | 7/2012 | Fukuura et al. | |
| 2012/0189872 A1 | 7/2012 | Umezawa et al. | |
| 2012/0196049 A1 | 8/2012 | Azuma et al. | |
| 2012/0207919 A1 | 8/2012 | Sakamoto et al. | |
| 2012/0225217 A1 | 9/2012 | Itoh et al. | |
| 2012/0251842 A1* | 10/2012 | Yuan et al. | 428/800 |
| 2012/0251846 A1 | 10/2012 | Desai et al. | |
| 2012/0276417 A1 | 11/2012 | Shimokawa et al. | |
| 2012/0300600 A1* | 11/2012 | Kanbe et al. | 369/13.32 |
| 2012/0307398 A1* | 12/2012 | Kanbe et al. | 360/75 |
| 2012/0308722 A1 | 12/2012 | Suzuki et al. | |
| 2013/0016591 A1* | 1/2013 | Tomikawa et al. | 369/13.02 |
| 2013/0040167 A1 | 2/2013 | Alagarsamy et al. | |
| 2013/0071694 A1 | 3/2013 | Srinivasan et al. | |
| 2013/0165029 A1 | 6/2013 | Sun et al. | |
| 2013/0175252 A1 | 7/2013 | Bourez | |
| 2013/0194901 A1 | 8/2013 | Kanbe et al. | |
| 2013/0208578 A1* | 8/2013 | Kanbe et al. | 369/13.24 |
| 2013/0216865 A1 | 8/2013 | Yasumori et al. | |
| 2013/0230647 A1 | 9/2013 | Onoue et al. | |
| 2013/0314815 A1 | 11/2013 | Yuan et al. | |
| 2014/0011054 A1 | 1/2014 | Suzuki | |
| 2014/0044992 A1 | 2/2014 | Onoue | |
| 2014/0050843 A1 | 2/2014 | Yi et al. | |
| 2014/0057134 A1* | 2/2014 | Inaba | 428/834 |
| 2014/0064047 A1* | 3/2014 | Niwa et al. | 369/13.33 |
| 2014/0093748 A1* | 4/2014 | Chen et al. | 428/831 |
| 2014/0151360 A1 | 6/2014 | Gregory et al. | |
| 2014/0234666 A1 | 8/2014 | Knigge et al. | |

OTHER PUBLICATIONS

Chen, et al. "Structure and Magnetic Properties of L10 FePt Film with Ag Heat Sink Layer," J.Appl.Phys.105, 07B72 (2009), 4 pages.

Yang, et al., "Highly Ordered FePt L1o Thin Films With Small Grains on RuAl Seed Layers", IEEE Transactions on Magnetics, vol. 47, No. 1, pp. 81-86, Jan. 2011, 6 pages.

Yang, et al., "Epitaxial Growth of L1o-FePt Granular Thin Films on TiC/RuAl Underlayers", IEEE Transactions on Magnetics, vol. 47, No. 10, pp. 4077-4079, Oct. 2011, 3 pages.

Shen, et al., "In situ epitaxial growth of ordered FePt (001) films with ultra small and uniform grain size using a RuAl underlayer", Journal of Applied Physics 97, 10H301 (2005), 3 pages.

Ferrenberg, Alan M. and D. P. Landau, Monte Carlo study of phase transitions in ferromagnetic bilayers, Center for Simulational Physics, The University of Georgia, Athens, Georgia 30602, J. Appl. Phys., vol. 70, No. 10, Nov. 15, 1991, pp. 2615-2617.

Sasaki, J. and F. Matsubara, Magnetic properties of mesoscopic ultrathin magnetic films with uniaxial anisotropy, J. Appl. Phys., vol. 87, No. 6, Mar. 15, 2000. pp. 3018-3022.

Thiele, J.-U., K. R. Coffey, M. F. Toney, J. A. Hedstrom, and A. J. Kellock, Temperature dependent magnetic properties of highly chemically ordered $Fe_{55-x}Ni_xPt_{45}$ L10 films, J. Appl. Phys., vol. 91, No. 10, May 15, 2002, pp. 6595-6600.

Cuccoli, Allesandro, Tommaso Roscilde, Valerio Tognetti, Ruggero Vais and Paola Verrucchi, Anisotropy and Ising-type transition of the S=5/2 two-dimensional Heisenberg antiferromagnet Mn-formate di-Urea, American Institute of Physics, J. Appl. Phys., vol. 93, No. 10, Parts 2 & 3, May 15, 2003, pp. 7637-7639.

Victora, R. H., Xi Chen and Tao Qu, Temporal Fluctuations of Magnetic Anisotropy and their Impact on HAMR Media Noise, The Center for Micromagnetics and Information Technologies, Aug. 18, 2010.

Hua Yuan, et al., U.S. Appl. No. 13/206,071, filed Aug. 9, 2011, 31 pages.

Gerardo A. Bertero, et al., U.S. Appl. No. 13/769,232, filed Feb. 15, 2013, 19 pages.

* cited by examiner

US 9,177,585 B1

MAGNETIC MEDIA CAPABLE OF IMPROVING MAGNETIC PROPERTIES AND THERMAL MANAGEMENT FOR HEAT-ASSISTED MAGNETIC RECORDING

CROSS-REFERENCE TO RELATED APPLICATION

This application claims priority to provisional U.S. Patent Application Ser. No. 61/894,527, filed on Oct. 23, 2013, which is hereby incorporated by reference in its entirety.

BACKGROUND

Conventional magnetic recording disk drives include a slider attached to a suspension and a media such as a disk. The slider typically includes a magnetic read transducer (reader) and a magnetic write transducer (writer). The writer magnetically records data as bits along a tracks in the media. The reader reads data back from the media.

The trend in magnetic recording is to higher areal densities. For example, densities of 1 Tbit/in$^2$ and higher are desired. To read, write and store data at such areal densities, the reader, writer, and media have evolved. For example, tunneling magnetoresistance (TMR) sensors may be used to read higher density media with sufficiently high signals and heat assisted magnetic recording (HAMR) writers may utilize laser light to heat regions of the media to temperatures near and/or above the Curie temperature of the media. This allows the writer to magnetically record data to the media at lower magnetic fields. Similarly, magnetic media have been developed to store data at higher areal densities.

Although such conventional magnetic recording disk drives function, there are drawbacks. For example, for areal densities of 1 Tbit/in$^2$, an average grain size for a bit may be desired to be less than six nanometers. Media having the desired grain size, thermal stability and other magnetic properties are thus desired. Accordingly, what is needed is a system and method for improving the performance of a magnetic recording disk drive at higher areal densities.

DETAILED DESCRIPTION OF THE PREFERRED EMBODIMENTS

Figure 1:
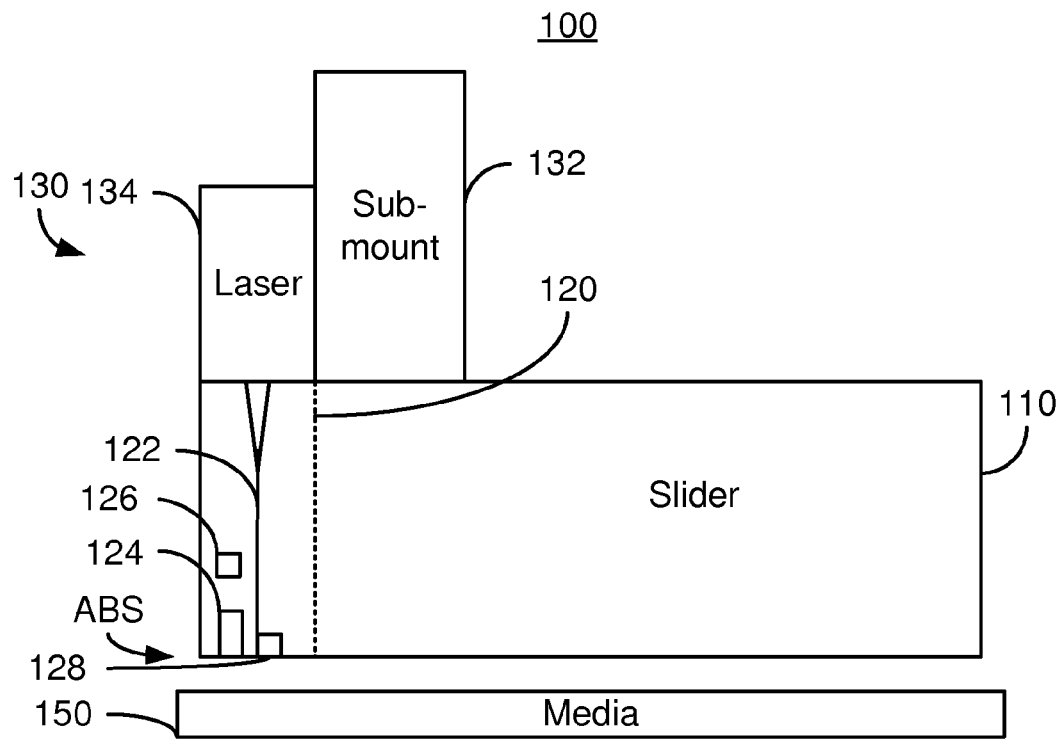
FIG. 1 depicts a side view of a HAMR magnetic recording disk drive.
Figure 2:
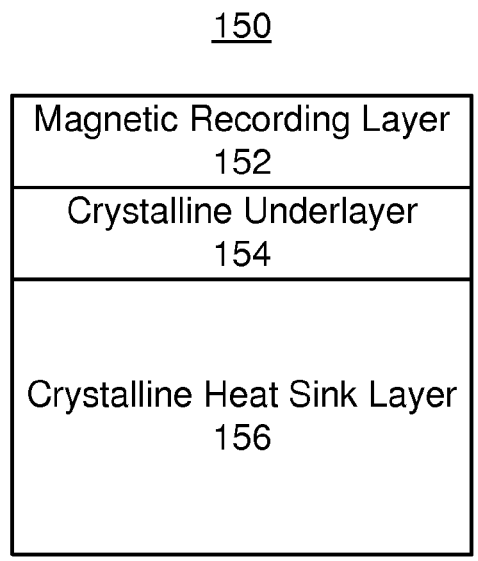
FIG. 2 depicts an exemplary embodiment of a magnetic recording media that may be usable in a HAMR disk drive.

FIG. 1 depicts a side view of an exemplary embodiment of a portion of a HAMR disk drive 100 including a write transducer 120. For clarity, FIG. 2 is not to scale. For simplicity not all portions of the HAMR disk drive 100 are shown. In addition, although the HAMR disk drive 100 is depicted in the context of particular components other and/or different components may be used. For example, circuitry used to drive and control various portions of the HAMR disk drive 100 is not shown. For simplicity, only single components 102, 110, 120 and 150 are shown. However, multiples of each components 102, 110, 120, and/or 150 and their sub-components, might be used.

The HAMR disk drive 100 includes a slider 110, a HAMR transducer 120, a laser assembly 130 and media 150. Additional and/or different components may be included in the HAMR disk drive 100. Although not shown, the slider 110, and thus the laser assembly 130 and HAMR transducer 120 are generally attached to a suspension (not shown). The laser assembly 130 includes a submount 132 and a laser 134. The submount 132 is a substrate to which the laser 134 may be affixed for improved mechanical stability, ease of manufacturing and better robustness. The laser 134 may be a chip such as a laser diode.

The HAMR transducer 120 is fabricated on the slider 110 and includes an air-bearing surface (ABS) proximate to the media 150 during use. In general, the HAMR transducer 120 includes a write transducer and a read transducer. However, for clarity, only the write portion of the HAMR head 120 is shown. The HAMR head 120 includes a waveguide 122, write pole 124, coil(s) 126, near-field transducer (NFT) 128. The waveguide 122 guides light from the laser 134 to the NFT 128, which resides near the ABS. The NFT 128 utilizes local resonances in surface plasmons to focus the light to magnetic recording media 150. At resonance, the NFT 128 couples the optical energy of the surface plasmons efficiently into the media 150 with a confined optical spot which is much smaller than the optical diffraction limit. This optical spot can rapidly heat a region of the recording medium 150 to near or above the Curie point of the recording media layer (not explicitly depicted in FIG. 1). High density bits can be written on a high coercivity medium with the pole 124 energized by the coils 126 to a modest magnetic field. The write pole 124 is thus formed of high saturation magnetization material(s) such as CoFe. The media 150 is configured to be usable at higher recording densities and, in some embodiments, to be used in the HAMR disk drive 100.

FIG. 2 depicts an exemplary embodiment of the magnetic media 150 usable in a disk drive such as the disk drive 100. For clarity, FIG. 2 is not to scale. For simplicity not all portions of the magnetic recording media are shown. For example, a substrate on which the magnetic recording media 150 is fabricated is not shown. Referring to FIGS. 1-2, the magnetic recording media includes a magnetic recording layer 152, a crystalline underlayer 154 and a crystalline heat sink layer 156. The crystalline heat sink layer is closer to the substrate (not shown) than the crystalline underlayer 154. The crystalline underlayer 154 is between the recording layer 152 and the crystalline heat sink layer 156. In other embodiments other and/or additional layers may be present. For example, although not shown in FIG. 2, an overcoat layer is generally used. The overcoat layer would reside on the magnetic recording layer 152 and between the magnetic recording layer 152 and the slider 110. Other layer(s) may also reside between the layers 152, 154 and 156 shown. However, the relationships between the layers 152, 154 and 156 may be preserved. Stated differently, the crystalline heat sink layer 156 is closer to the substrate than the crystalline underlayer 154. Similarly, the crystalline underlayer 154 is closer to the substrate than the magnetic recording layer 152. The magnetic recording layer 152 is also closer to the slider 110 than the layers 154 and 156.

The magnetic recording layer 152 stores magnetic data recorded by the transducer 120. Thus, the magnetic recording layer may be desired to have a small grain size such as less than ten nm and be thermally stable in the media 150. In some embodiments, the magnetic recording layer 152 includes FePt. For example, FePt having an L10 crystal structure may be used as the recording layer 152. The FePt may also have a (001) orientation. In such embodiments, the magnetic recording layer 152 may have a high perpendicular anisotropy. In other embodiments other and/or different materials may be used for the magnetic recording layer 152.

The crystalline underlayer 154 and crystalline heat sink layer 156 each has a crystal structure. Stated differently, each of the layers 154 and 156 has an ordered lattice structure (as opposed to an amorphous layer). In some embodiments, the crystal structures are the same. For example, both the crystalline underlayer 154 and the crystalline heat sink layer 156 may be body-centered cubic (BCC). In some embodiments, the crystalline underlayer 154 and the crystalline heat sink layer 156 each has an orientation. In some embodiments, the crystallographic orientation of the layers 154 and 156 may be the same. For example, the layers 154 and 156 may each have a (200) orientation.

The heat sink layer 156 may be configured not only to have the desired crystal structure, but also to function as a heat sink. Thus, the thermal properties of the media 150 may be managed at least in part using the heat sink layer 156. The thermal conductivity of the heat sink layer 156 may be desired to be high. In some embodiments, the thermal conductivity of the heat sink layer 156 is at least fifty Watts/mK. In some such embodiments, the heat sink layer 156 has a thermal conductivity of at least seventy Watts/mK. In some embodiments, the above numerical values for thermal conductivity are as measured using a pump probe method, otherwise known as a time domain thermo-reflectance (TDTR) technique. In other embodiments other methods and other numerical values may be used. The heat sink layer 156 may include material(s) such as Cu, Ag, Au, V, Cr, Nb Ru, W and/or Mo. In some embodiments, the heat sink layer 156 includes W or Mo. However, if Cu, Ag, and/or Au are used, such materials may be present as only part of the heat sink layer 156. For example, the heat sink 156 may be a multilayer heat sink. The Au, Ag, and/or Cu may be a seed layer or one of the layers in the multilayer heat sink layer 156. In contrast, if W or Mo are used, the heat sink layer 150 may consist of only W and/or Mo. In some embodiments, the heat sink layer 156 may be at least forty nanometers thick and not more than one hundred twenty nanometers thick. In some such embodiments, the heat sink layer 156 may be at least eighty and not more than one hundred nanometers thick.

The thermal conductivity of the crystalline underlayer 154 is also configured to manage the thermal properties of the magnetic recording media 150. The thermal conductivity of the crystalline underlayer 154 may be less than that of the heat sink layer. However, the thermal conductivity of the crystalline underlayer 154 may also be sufficiently high that the crystalline underlayer does not act as a thermal barrier. In some embodiments, the crystalline underlayer 154 has a thermal conductivity of at least ten W/mK. In some such embodiments, the thermal conductivity of the crystalline underlayer 154 is at least twenty W/mK. The crystalline underlayer 154 may, for example, include one or more of CrMo, CrV, Cr, MoTa, MoW, MoV, CrW, Mo and RuAl. As discussed above, the numerical values of the thermal conductivities discussed herein may be measured using TDTR. Thus, measurements by other methods may result in differences in the experimental values of thermal conductivities discussed herein.

The magnetic media 150 may have improved performance. The crystal structure of the crystalline underlayer 154 may result in an improved crystal structure of the magnetic recording layer 152. This is particularly true if an orientation control layer (not shown in FIG. 2) is used between the crystalline underlayer 154 and the magnetic recording layer 152. Recently developed magnetic recording media may use an amorphous underlayer for growth of the orientation control layer. Such an amorphous underlayer is desired to provide a smooth surface for growth of the orientation control layer. In order to provide a smooth surface, the amorphous underlayer is desired to be relatively thick. However, even for a thicker amorphous underlayer and orientation control layer, the crystal structure and orientation of the magnetic recording layer 152 may not be as desired. In contrast, the crystalline underlayer 154 may provide the desired growth template for the magnetic recording layer 152. For example, a magnetic recording layer 152 including FePt having an L10 structure and a (001) orientation may be better grown on a BCC crystalline underlayer 154 having a (200) orientation. Because the magnetic recording layer 152 has a desired crystal structure, the magnetic properties of the magnetic recording layer 152 may also be closer to those desired. For example, the perpendicular anisotropy may be enhanced. Thus, performance of the magnetic recording media 150 at higher densities may be improved.

Better thermal management of the magnetic recording media 150 may be attained. The amorphous underlayer described above may have a thermal conductivity of ten W/mK or less. As a result, the amorphous underlayer may act as a thermal barrier between the magnetic recording layer 152 and the heat sink layer. In contrast, the crystalline underlayer 154 has a higher thermal conductivity. As a result, heat may be better conducted from the magnetic recording layer 152 to the crystalline heat sink layer 156. Thus, a larger thermal gradient may be obtained in the magnetic recording media 150. The region of the magnetic recording media 150 heated by the laser 134 (thermal spot size) may be better confined. Thus, performance of the magnetic recording media 150 at higher areal densities may be improved.

Figure 3:
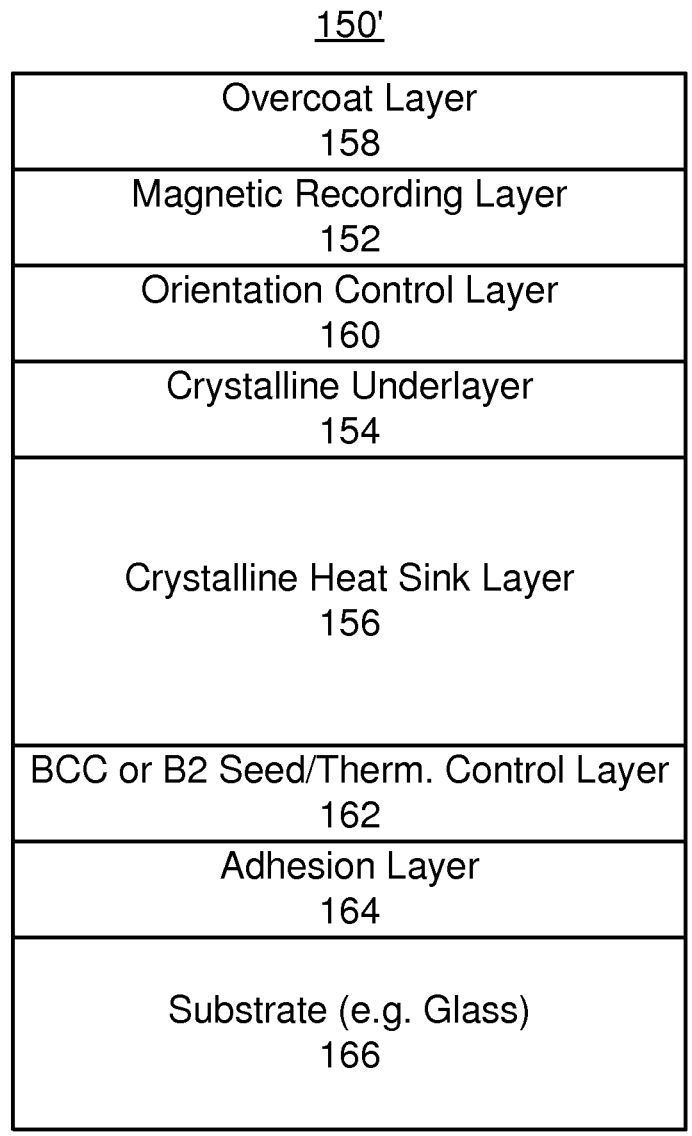
FIG. 3 depicts another exemplary embodiment of a magnetic recording media that may be usable in a HAMR disk drive.

FIG. 3 depicts an exemplary embodiment of the magnetic media 150' usable in a disk drive such as the disk drive 100. For clarity, FIG. 3 is not to scale. For simplicity not all portions of the magnetic recording media are shown. The magnetic media 150' is analogous to the magnetic recording media 150 depicted in FIG. 2. Consequently, similar components have analogous labels. The magnetic recording media 150' includes a magnetic recording layer 152, a crystalline underlayer 154 and a crystalline heat sink layer 156 analogous to the magnetic recording layer 152, crystalline underlayer 154 and crystalline heat sink layer 156, respectively, depicted in FIG. 2. Also shown are an overcoat layer 158, an orientation control layer 160, a seed/thermal control layer 162, an adhesion layer 164 and a substrate 166. The substrate 166 may be glass, but may also be another material.

The adhesion layer 164 may be used to help ensure that the remaining layers 162, 156, 154, 160 and 152 do not delaminate from the substrate 166. For example, the adhesion layer may include NiTa, CrTa, CrTi and/or Ta. The seed layer/thermal control layer 162 may include one or more of RuAl, RuTi, Cr and NiAl. In some embodiments, the seed/thermal control layer 162 provides the desired growth template for the crystalline heat sink layer 156. Thus, the layer 162 functions as a seed layer. Thus, the layer 162 may allow for the crystalline heat sink layer 156 to have the desired crystal structure and orientation. In some embodiments, the layer 162 improves the growth of the crystalline heat sink layer 156 has a B2 or a BCC structure having a (200) orientation. In some embodiments, the layer 162 aids in thermal management of the media 150'. For example, the thermal conductivity of the layer 162 may be configured as desired. In some embodiments, the thermal conductivity is within the range of the thermal conductivities of RuAl, RuTi, Cr and NiAl. In other embodiments, the layer 162 aids both in growth of the crystalline heat sink layer 156 having the desired structure and orientation and in thermal management for the media 150'. Thus, the seed/thermal control layer 162 may function as a seed layer for the layer 156, a thermal control layer for the media 150', or both.

The crystalline heat sink layer 156 is configured not only to function as a heat sink, but also to have the desired crystal structure. The thickness of the crystalline heat sink layer 156 may be in the range described above. The thermal conductivity of the heat sink layer is also desired to be high. In some embodiments, the thermal conductivity of the crystalline heat sink layer 156 is in the range described above. The crystalline heat sink layer 156 may also have the desired crystal structure and orientation. In some embodiments, the crystalline heat sink layer 156 has a B2 or BCC crystal structure and a (200) orientation. For example, the heat sink layer 156 may include Cu, Ag, Au, V, Cr, Nb, Ru, W and/or Mo. In some embodiments, the heat sink layer 156 includes W or Mo. If Cu, Ag, and/or Au are used, such materials may be present as only part of the heat sink layer 156.

The crystalline underlayer 154 also has a crystal structure. In some embodiments, the crystalline underlayer 154 has a BCC crystal structure and a (200) orientation. Thus, the crystal structures and orientations of the layers 154 and 156 may be the same. The thermal conductivity of the crystalline underlayer 154 may be less than that of the heat sink layer. In some embodiments, the crystalline underlayer 154 has a thermal conductivity of at least ten W/mK. In some such embodiments, the thermal conductivity of the crystalline underlayer 154 is at least twenty W/mK. The crystalline underlayer 154 may, for example, include one or more of CrMo, CrV, Cr, MoTa, MoW, MoV, CrW, Mo and RuAl. In some such embodiments, the crystalline underlayer 154 may be not more than 25 nm thick.

The orientation control layer 160 is used to provide a growth template for the desired orientation and crystal structure of the magnetic recording layer 152. In some embodiments, the magnetic recording layer 152 includes FePt. For example, FePt having an L10 crystal structure and a (001) orientation may be used as the recording layer 152. The orientation control layer 160 may assist growth of the magnetic recording layer 152 in achieving this crystal structure and orientation. In some embodiments, the orientation control layer 160 is crystalline MgO having a (200) orientation. The crystalline underlayer 154 may function as a seed layer for the orientation control layer 160. Thus, a particular lattice parameter, crystal structure and orientation of the crystalline underlayer layer 154 are desired to match that of the orientation control layer 160. The lattice parameter of the crystalline underlayer 154 may be desired to differ from the lattice parameter of the orientation control layer 160 by not more than ten percent. In some such embodiments, this difference is not more than four percent. In other embodiments, the lattice parameter mismatch is not more than two percent. Further, the orientation control layer 160 may be relatively thin. In some such embodiments, the orientation control layer 160 may be not more than 25 nm thick.

The magnetic media 150' may have improved performance. Use of the layer 164 may improve the crystal structure of the crystalline heat sink layer 156 and/or thermal management in the media 150'. As discussed above, the crystal structure of the crystalline underlayer 154 may result in an improved crystal structure of the magnetic recording layer 152. This is particularly true for the magnetic media 150', which includes the orientation control layer 160. The crystalline underlayer 154 may provide the desired growth template for the orientation control layer 160. In turn, the orientation control layer 160 provides a growth template for the desired crystal structure and orientation for the magnetic recording layer 152. Because the magnetic recording layer 152 has a desired crystal structure and orientation, the magnetic properties of the magnetic recording layer 152 may also be closer to those desired. Because of the use of the crystalline underlayer 154, this improvement may be obtained for a thinner orientation control layer 160. Consequently, a better path for heat to flow to the crystalline heat sink layer 156 may be provided. Thermal management of the media 150' may be improved. The thermal conductivity of the crystalline underlayer 154 may be in the ranges described above. As a result, heat may be better conducted between the magnetic recording layer 152 and the heat sink layer 156. Thus, a larger thermal gradient may be obtained in the magnetic recording media 150. The region of the magnetic recording media 150 heated by the laser 134 (thermal spot size) may be better confined. Smaller bits may be written and less laser power consumed. Thus, performance of the magnetic recording media 150' may be improved.

Figure 4:
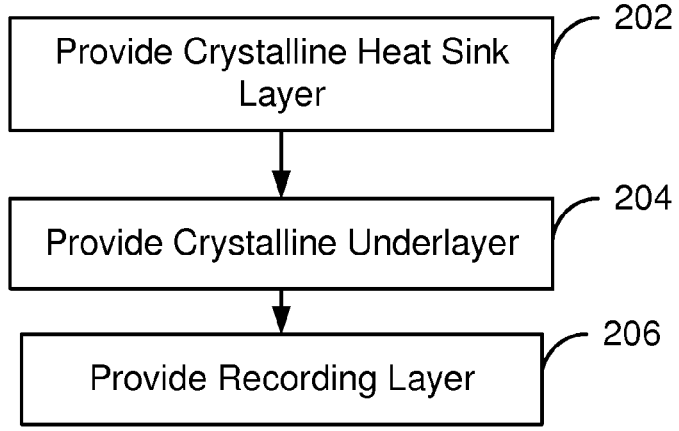
FIG. 4 depicts a flow chart of an exemplary embodiment of a method for providing magnetic recording media usable in a HAMR disk drive.

FIG. 4 depicts an exemplary embodiment of a method 200 for providing a magnetic recording media such as the media 150. For simplicity, some steps may be omitted, interleaved, and/or combined. The method 200 is also described in the context of providing a magnetic recording disk drive 100 and media 150 depicted in FIGS. 1-2. However, the method 200 may be used to fabricate multiple magnetic recording heads at substantially the same time. The method 200 may also be used to fabricate other magnetic recording media. The method 200 is also described in the context of particular layers. A particular layer may include multiple materials and/or multiple sub-layers. The method 200 also may start after formation of other portions of the magnetic recording media. For example, the method 200 may start after a portion of the media 150 has been fabricated.

Referring to FIGS. 2 and 4, the crystalline heat sink layer 156 is provided, via step 202. Step 202 may include depositing one or more of Cu, Ag, Au, V, Cr, Nb, W, Mo and Ru. The Cu, Ag and/or Au are used in conjunction with other materials such as the W, Mo, V, Cr, and Nb. The crystalline underlayer 154 is provided, via step 204. Step 204 may include depositing one or more of CrMo, CrV, Cr, MoTa, MoW, MoV, CrW, Mo and RuAl. The magnetic recording layer 154 may be deposited, via step 206. Step 206 may include depositing a material including FePt.

Using the method 200, the magnetic disk drive 100 and magnetic recording media 150 may be provided. Thus, the benefits of the magnetic recording media 150 and magnetic recording transducer 120 may be achieved.

Figure 5:
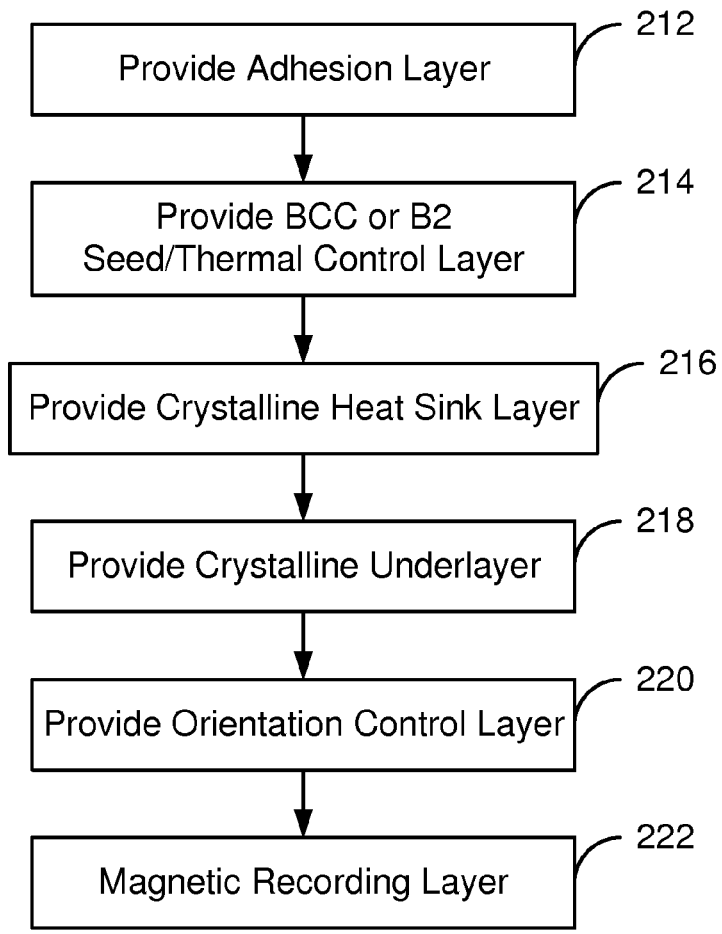
FIG. 5 depicts a flow chart of another exemplary embodiment of a method for fabricating a magnetic recording media usable in a HAMR disk drive.

FIG. 5 depicts an exemplary embodiment of a method 210 for providing a magnetic recording media such as the media 150'. For simplicity, some steps may be omitted, interleaved, and/or combined. The method 210 is also described in the context of providing a HAMR disk 100 and media 150' depicted in FIGS. 1 and 3. However, the method 210 may be used to fabricate multiple magnetic recording heads at substantially the same time. The method 210 may also be used to fabricate other magnetic recording media. The method 210 is also described in the context of particular layers. A particular layer may include multiple materials and/or multiple sub-layers. The method 210 also may start after formation of other portions of the magnetic recording media 150'.

Referring to FIGS. 3 and 5, the adhesion layer 164 and seed layer 162 are provided on the substrate 166 via steps 212 and 214, respectively. The crystalline heat sink layer 156 is provided, via step 216. Step 216 may include depositing one or more of Cu, Ag, Au, V, Cr, Nb, W, Mo and Ru. The Cu, Ag and Au are, however, used for only part of the heat sink layer 156. The crystalline underlayer 154 is provided, via step 218. Step 218 may include depositing one or more of CrMo, CrV, Cr, MoTa, MoW, MoV, CrW, Mo and RuAl. The crystalline MgO orientation control layer 160 is deposited, via step 220. The magnetic recording layer 154 may be deposited, via step 222. Step 222 may include depositing a material including FePt. Fabrication of the magnetic recording media 150/150' may then be completed. For example, the overcoat layer 158 may also be provided after step 222.

Using the method 210, the magnetic disk drive 100 and magnetic recording media 150' may be provided. Thus, the benefits of the magnetic recording media 150' and disk drive 100 may be achieved.

We claim:

1. A magnetic recording media usable in a heat assisted magnetic recording (HAMR) disk drive, the magnetic recording media comprising:
   a magnetic recording layer for storing magnetic data;
   a crystalline underlayer having a first crystal structure, the crystalline underlayer including at least one of CrMo, CrV, Cr, MoTa, MoW, MoV, CrW, Mo and RuAl and being a single layer;
   an orientation control layer between the magnetic recording layer and the crystalline underlayer, the crystalline underlayer having a first lattice parameter, the orientation control layer having a second lattice parameter that differs from the first lattice parameter by not more than ten percent; and
   a crystalline heat sink layer having a second crystal structure, the crystalline underlayer being between the crystalline heat sink layer and the magnetic recording layer, the crystalline heat sink layer consisting of at least one of Au, V, Cr, Nb and Ru;
   wherein the crystalline underlayer adjoins and shares a first interface with the crystalline heat sink layer and wherein the orientation control layer adjoins and shares a second interface with the crystalline underlayer.

2. The magnetic recording media of claim 1 wherein the first crystal structure is the same as the second crystal structure.

3. The magnetic recording media of claim 2 wherein the first crystal structure is body-centered cubic.

4. The magnetic recording media of claim 1 wherein the crystalline underlayer has a thermal conductivity of at least 10 W/mK.

5. The magnetic recording media of claim 4 wherein the thermal conductivity is at least 10 W/mK as measured by time domain thermo-reflectance.

6. The magnetic recording media of claim 5 wherein the thermal conductivity is at least 20 W/mK as measured by the time domain thermo-reflectance and wherein the crystalline heat sink layer has a heat sink thermal conductivity greater than the thermal conductivity of the crystalline underlayer.

7. The magnetic recording media of claim 1 wherein the orientation control layer includes crystalline MgO having an orientation of (200).

8. The magnetic recording media of claim 1 wherein the second lattice parameter differs from the first lattice parameter by not more than four percent.

9. The magnetic recording media of claim 8 wherein the second lattice parameter differs from the first lattice parameter by not more than two percent.

10. The magnetic recording media of claim 1 further comprising:
    an adhesion layer; and
    a seed layer residing on the adhesion layer and between the adhesion layer and the crystalline heat sink layer.

11. The magnetic recording media of claim 10 wherein the seed layer includes at least one of RuAl, RuTi, Cr and NiAl.

12. A magnetic recording media usable in a heat assisted magnetic recording (HAMR) disk drive, the magnetic recording media comprising:
    an adhesion layer;
    a seed layer residing on, adjoining and sharing a first interface with the adhesion layer, the seed layer and including at least one of RuAl, RuTi, Cr and NiAl;
    a crystalline heat sink layer having a body-centered cubic (BCC) structure, the seed layer being between the adhesion layer and the crystalline heat sink layer, the heat sink layer including at least one of Au, V, Cr, Nb and Ru, the seed layer adjoining and sharing a second interface with the crystalline heat sink layer;
    a crystalline underlayer having the BCC structure and including at least one of CrMo, CrV, Cr, MoTa, MoW, MoV, CrW, Mo and RuAl, the crystalline underlayer being a single layer and adjoining and sharing a third interface with the crystalline heat sink layer;
    an orientation control layer including crystalline MgO having a (200) orientation, the crystalline underlayer being between the crystalline heat sink layer and the orientation control layer, the orientation control layer adjoining and sharing a fourth interface with the crystalline underlayer;
    a magnetic recording layer for storing magnetic data, the magnetic recording layer including FePt having a (001) orientation and adjoining and sharing a fifth interface with the orientation control layer; and
    an overcoat layer including diamond-like carbon, the magnetic recording layer being between the overcoat layer and the orientation control layer.

13. A heat assisted magnetic recording (HAMR) disk drive comprising:
    a media including a magnetic recording layer, a crystalline underlayer, an orientation control layer between the magnetic recording layer and the crystalline underlayer and a crystalline heat sink layer, the magnetic recording layer for storing magnetic data, the crystalline underlayer having a first crystal structure, the crystalline heat sink layer having a second crystal structure, the crystalline underlayer being between the crystalline heat sink layer and the magnetic recording layer, the crystalline underlayer having a first lattice parameter, the orientation control layer having a second lattice parameter that differs from the first lattice parameter by not more than ten percent, the crystalline heat sink layer consisting of at least one of Au, V, Cr, Nb and Ru, the crystalline underlayer including at least one of CrMo, CrV, Cr, MoTa, MoW, MoV, CrW, Mo and RuAl and being a single layer, the crystalline underlayer adjoining and sharing a first interface with the crystalline heat sink layer and the orientation control layer adjoining and sharing a second interface with the crystalline underlayer;
    a laser for providing energy;
    a slider including a HAMR write transducer, the HAMR transducer having air-bearing surface (ABS), a main pole, a waveguide and at least one coil, the main pole being configured to write to a region of the media, the waveguide being optically coupled with the laser and directing a portion of the energy toward the ABS, the at least one coil for energizing the main pole.

14. A method for fabricating a magnetic recording media usable in a heat assisted magnetic recording (HAMR) disk drive, the method comprising:
    providing a crystalline heat sink layer having a first crystal structure on a substrate, the crystalline heat sink layer consisting of at least one of Au, V, Cr, Nb and Ru;
    providing a crystalline underlayer on the crystalline heat sink layer, the crystalline underlayer having a second crystal structure, the crystalline underlayer including at least one of CrMo, CrV, Cr, MoTa, MoW, MoV, CrW, Mo and RuAl and being a single layer;
    providing an orientation control layer between the magnetic recording layer and the crystalline underlayer, the crystalline underlayer having a first lattice parameter, the orientation control layer having a second lattice parameter that differs from the first lattice parameter by not more than ten percent, the crystalline underlayer adjoining and sharing a first interface with the crystalline heat sink layer and the orientation control layer adjoining and sharing a second interface with the crystalline underlayer; and
    providing a magnetic recording layer for storing magnetic data, the crystalline underlayer being between the crystalline heat sink layer and the magnetic recording layer.

15. The method of claim 14 wherein the first crystal structure and the second crystal structure are each body-centered cubic.

16. The method of claim 14 wherein the crystalline underlayer includes at least one of CrMo, CrV, Cr, MoTa, MoW, MoV, CrW, Mo and RuAl.

17. The method of claim 14 further comprising:
    providing an adhesion layer; and
    providing a seed layer residing on the adhesion layer and between the adhesion layer and the crystalline heat sink layer, the seed layer including at least one of RuAl, RuTi, Cr and NiAl; and
    providing an orientation control layer between the magnetic recording layer and the crystalline underlayer, the orientation control layer including crystalline MgO having an orientation of (200).

18. A method for fabricating a magnetic recording media usable in a heat assisted magnetic recording (HAMR) disk drive, the method comprising:
    providing an adhesion layer;
    providing a seed layer residing on and sharing a first interface with the adhesion layer;
    providing a crystalline heat sink layer having a first crystal structure on a substrate, the seed layer being between the adhesion layer and the crystalline heat sink layer, the seed layer including at least one of RuAl, RuTi, Cr and NiAl, the seed layer adjoin and sharing a second interface with the crystalline heat sink layer, the crystalline heat sink layer consisting of at least one of Au, V, Cr, Nb and Ru;
    providing a crystalline underlayer on, adjoining and sharing a third interface with the crystalline heat sink layer, the crystalline underlayer having a second crystal structure and being a single layer;
    providing an orientation control layer including crystalline MgO having an orientation of (200), the orientation control layer adjoining and sharing a fourth interface with the crystalline underlayer; and
    providing a magnetic recording layer for storing magnetic data, the crystalline underlayer being between the crystalline heat sink layer and the magnetic recording layer, the orientation control layer being between the magnetic recording layer and the crystalline underlayer, the magnetic recording layer adjoining the orientation control layer;
    wherein the crystalline underlayer has a first lattice parameter, the orientation control layer has a second lattice parameter that differs from the first lattice parameter by not more than two percent.

19. The method of claim 14 wherein the crystalline underlayer has a thermal conductivity of at least 10 W/mK as measured by time domain thermo-reflectance.

* * * * *